(12) United States Patent
Giustiniano

(10) Patent No.: US 9,086,334 B2
(45) Date of Patent: Jul. 21, 2015

(54) METHOD OF DETERMINING THE STRESS THAT SHOULD BE APPLIED TO A TYRE DURING A HIGH-EFFICIENCY INDOOR ENDURANCE TEST

(75) Inventor: Mattia Giustiniano, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/007,083

(22) PCT Filed: Mar. 26, 2012

(86) PCT No.: PCT/IB2012/051436
§ 371 (c)(1),
(2), (4) Date: Oct. 30, 2013

(87) PCT Pub. No.: WO2012/131569
PCT Pub. Date: Oct. 4, 2012

(65) Prior Publication Data
US 2014/0067190 A1    Mar. 6, 2014

(30) Foreign Application Priority Data
Mar. 25, 2011   (IT) .............................. TO2011A0262

(51) Int. Cl.
| | | |
|---|---|---|
| *G01M 17/00* | (2006.01) | |
| *G06F 7/00* | (2006.01) | |
| *G06F 19/00* | (2011.01) | |
| *G01M 17/02* | (2006.01) | |
| *G01M 17/04* | (2006.01) | |

(52) U.S. Cl.
CPC .............. *G01M 17/02* (2013.01); *G01M 17/04* (2013.01)

(58) Field of Classification Search
CPC .............................. G01M 17/02; G01M 17/04
USPC .................................................. 701/29.1–29.9
See application file for complete search history.

(56) References Cited

U.S. PATENT DOCUMENTS

| | | |
|---|---|---|
| 2005/0066719 A1 | 3/2005 | Turner et al. |
| 2009/0121891 A1 | 5/2009 | Sigillito |

FOREIGN PATENT DOCUMENTS

EP      2 246 686 A1    11/2010

OTHER PUBLICATIONS

International Search Report for PCT/IB2012/051436 dated Jul. 3, 2012.

*Primary Examiner* — Maceeh Anwari
(74) *Attorney, Agent, or Firm* — Sughrue Mion, PLLC

(57) ABSTRACT

A method of determining the stress that should be applied to a tire during an indoor endurance bench test, the method including the steps of: driving a vehicle along a sample road route; measuring variations in the longitudinal speed and position of the vehicle during its journey along the sample road route; and calculating the inertial forces acting on the vehicle during its journey along the sample road route, on the basis of variations in the longitudinal speed and position of the vehicle.

13 Claims, 4 Drawing Sheets

METHOD OF DETERMINING THE STRESS THAT SHOULD BE APPLIED TO A TYRE DURING A HIGH-EFFICIENCY INDOOR ENDURANCE TEST

CROSS REFERENCE TO RELATED APPLICATIONS

This is a National Stage of International Application No. PCT/IB2012/051436, filed Mar. 26, 2012, claiming priority from Italian Patent Application No. TO2011A000262, filed Mar. 25, 2011, the contents of all of which are incorporated herein by reference in their entirety.

TECHNICAL FIELD

The present invention relates to method of determining the stress that should be applied to a tyre during an indoor endurance bench test.

PRIOR ART

Various tests are carried out indoors using a test bench as bench testing has very low costs (use of a real vehicle and driver is not necessary) and offers extremely high repeatability (the stress applied to the tyre and the boundary conditions, such as temperature and characteristics of the road surface are known and easily adjusted). The test bench enables a wide variety of stresses to be applied to a tyre, but to render a bench test as realistic as possible (i.e. as similar as possible to what happens on the road) and to render an indoor bench test comparable to an outdoor test on public roads, it is necessary to know precisely the stresses to which a tyre is subjected during road use in order to reproduce them on the test bench. To this end, outdoor tests are carried out on public roads using a vehicle equipped with a measuring unit that measures and records the forces acting on the tyres; at the end of an outdoor test of this type, the measuring unit has recorded the course over time of the forces that acted on the tyres and this course over time is provided to the bench actuators so that it can be faithfully reproduced during indoor bench testing.

To reduce the overall duration of the outdoor test (which is planned to last a number of hours and cover several hundred kilometers) and to ensure that the outdoor test is conducted under repeatable conditions (obviously, as far as possible on roads open to the public), the vehicle should always be driven at the maximum speed permitted by the Highway Code during the outdoor test. However, the maximum speed permitted by the Highway Code on public roads is, in any case, relatively low (generally between 50 km/h and 90 km/h). In consequence, the overall average speed of the test is quite low (normally well below the nominal performance achievable with a modern test bench) and therefore the indoor test that faithfully reproduces the outdoor test offers modest efficiency (or rather, the test bench is underused, remaining distant from its nominal performance levels).

DESCRIPTION OF INVENTION

The object of the present invention is to provide a method to determine the stress that should be applied to a tyre during an indoor endurance bench test, this method being devoid of the above-described drawbacks and, in particular, of easy and inexpensive implementation.

According to the present invention, a method is provided to determine the stress that should be applied to a tyre during an indoor endurance bench test, as established in the appended claims.

BRIEF DESCRIPTION OF DRAWINGS

The present invention will now be described with reference to the attached drawings, which illustrate a non-limitative embodiment, where.

PREFERRED EMBODIMENTS OF THE INVENTION

Figure 1:
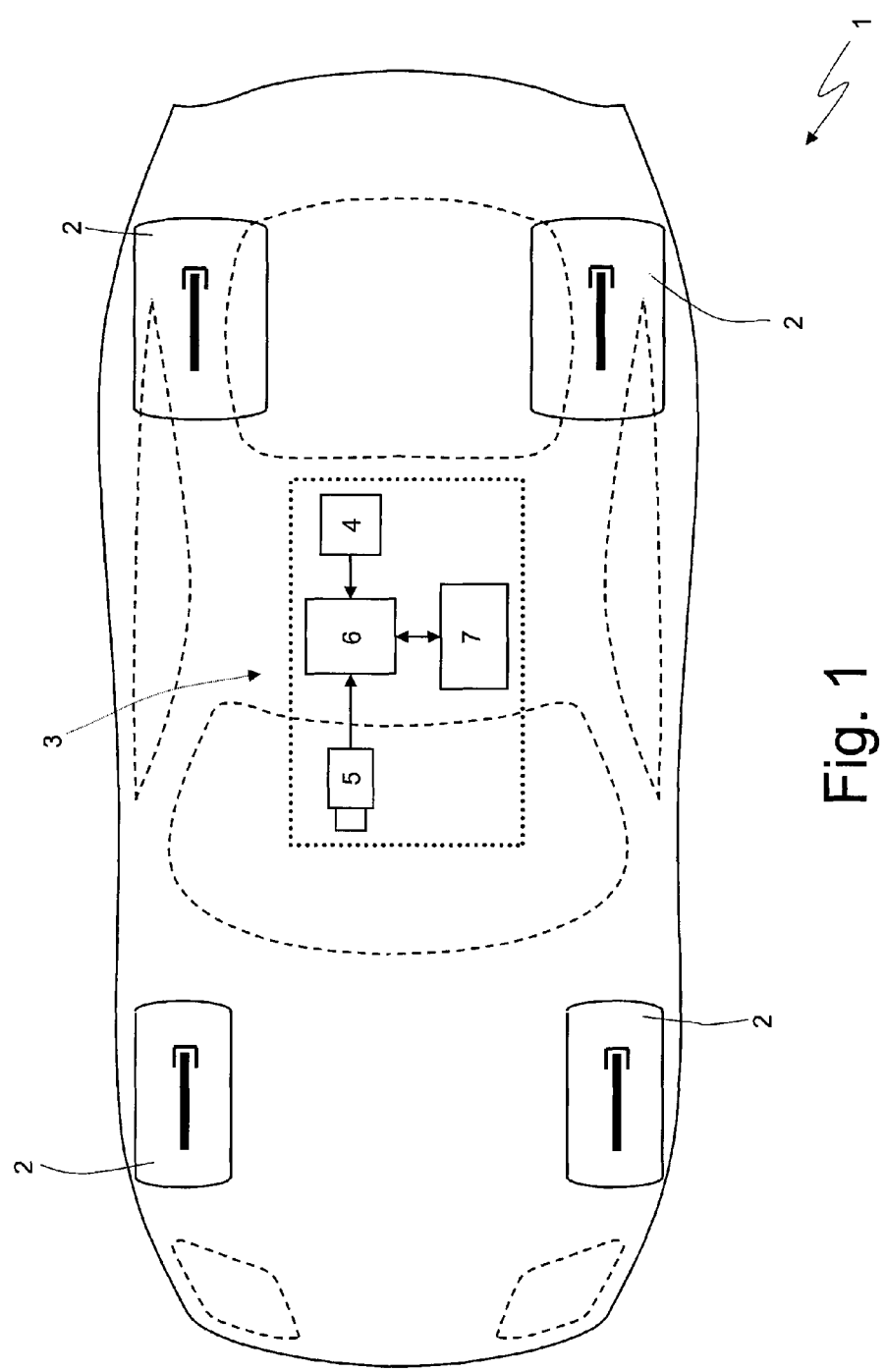
FIG. 1 schematically shows a vehicle equipped with a measuring unit for measuring the necessary physical quantities for subsequently estimating the forces that act on the tyres.
Figure 2:
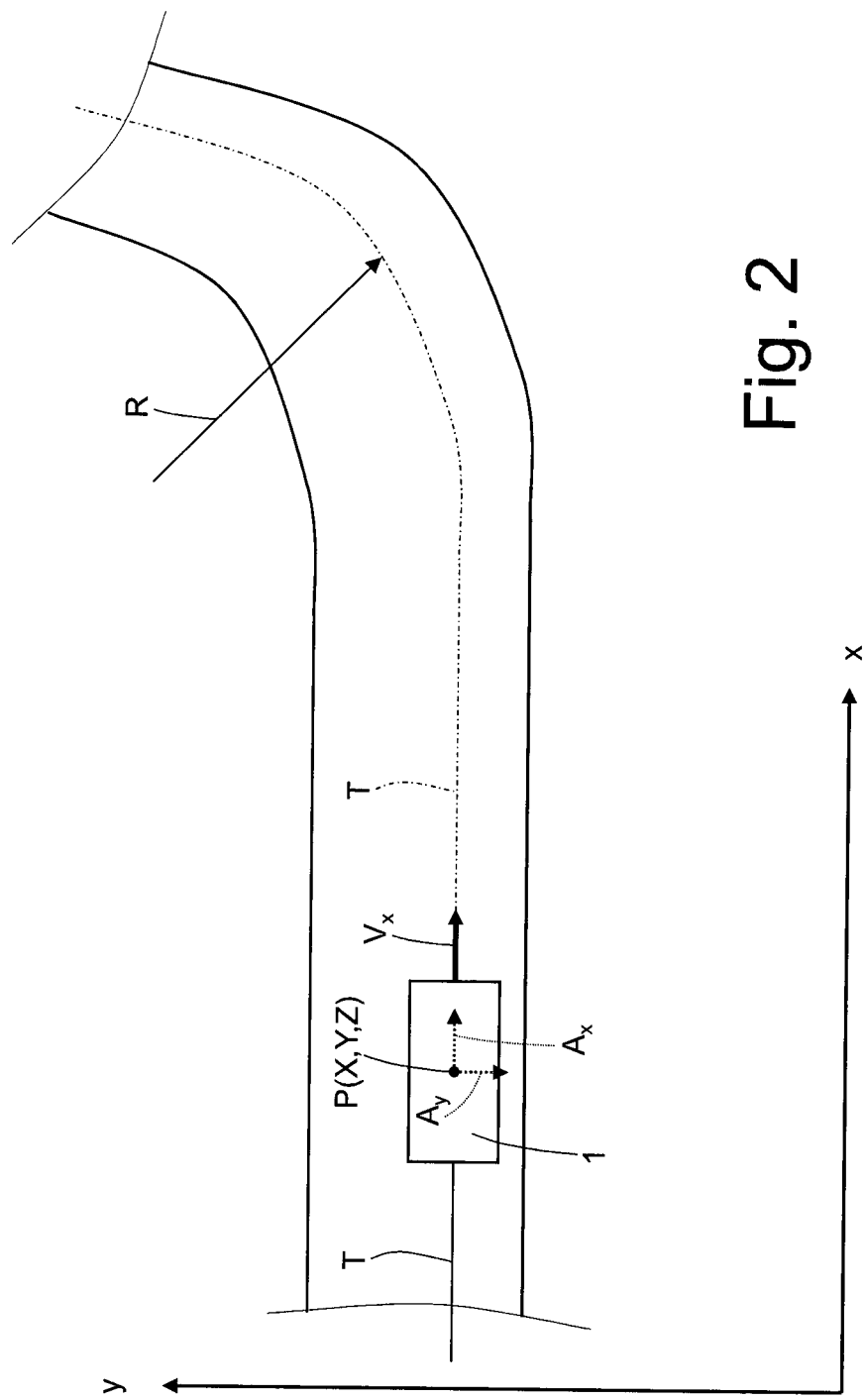
FIG. 2 schematically shows a section of a sample road route followed by the vehicle of FIG. 1.
Figure 3:
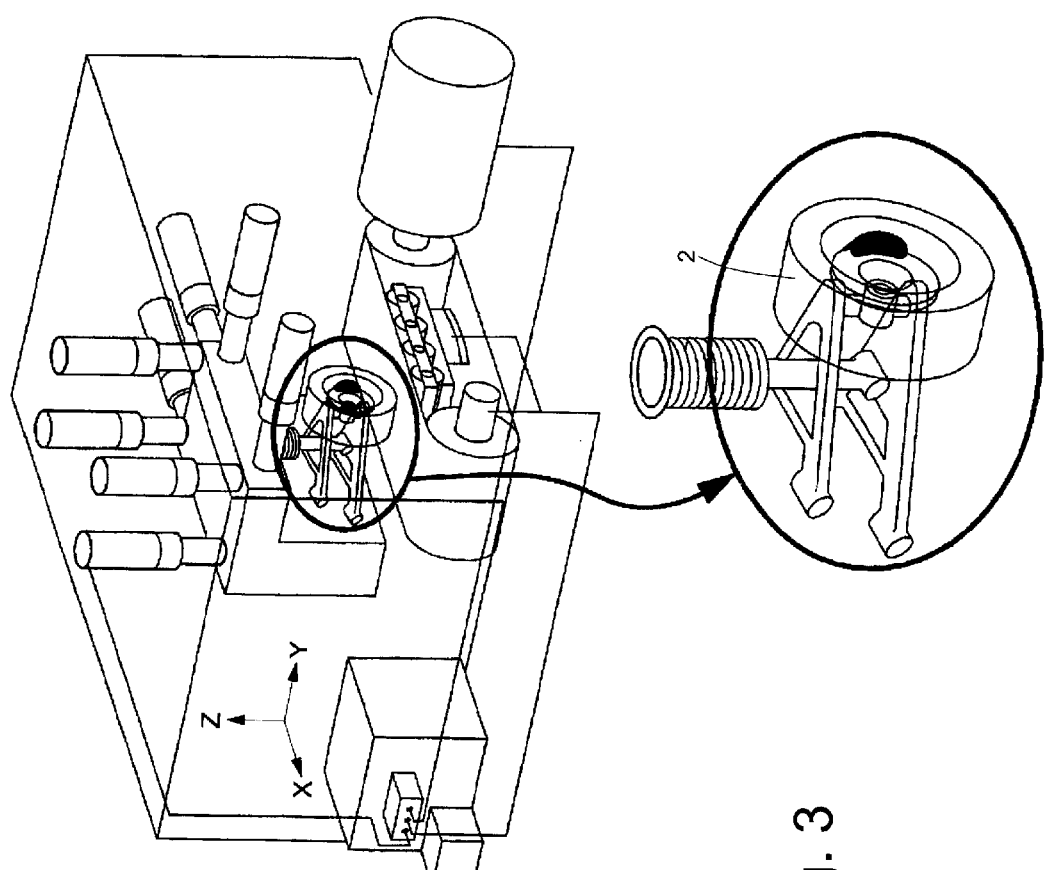
FIG. 3 schematically shows a test bench that subjects a tyre to an indoor endurance test.

In FIG. 1, reference numeral 1 indicates, in its entirety, a vehicle equipped with four tyres 2.

The vehicle 1 is equipment with a measuring unit 3 for measuring the necessary physical quantities for subsequently estimating the forces that act on the tyres 2. Thanks to the information recorded by the measuring unit 3, it is possible the determine the stress (forces) that should be applied to a tyre during an indoor endurance bench test to simulate with high accuracy a similar outdoor endurance test carried out on roads open to vehicular traffic. In other words, by processing the information recorded by the measuring unit 3, as described further on, it is possible to determine the course over time of the stress (forces) that should be applied to a tyre during an indoor endurance bench test to subject the tyre to the same wear that would take place in a similar outdoor endurance test carried out on roads open to vehicular traffic.

The measuring unit 3 comprises a satellite positioning device 4, which measures the longitudinal speed $V_x$ of forward movement of the vehicle 1 and the position P of the vehicle 1 in real time using the GPS standard. The position P of the vehicle 1 is defined by three coordinates X,Y,Z of a three-dimensional reference system having three mutually perpendicular axes; the X and Y coordinates correspond to latitude and longitude and define a plane, whilst the Z coordinate provides an altitude with respect to a reference plane (typically sea level).

In addition, the measuring unit 3 comprises a camera 5 that is arranged inside the vehicle to capture the road in front of the vehicle 1 (for example, the camera 5 could be placed facing the windscreen of the vehicle 1).

Lastly, the measuring unit 3 comprises a mass storage device 6 (consisting of a hard disk and/or RAM memory) capable of storing the data supplied by the satellite positioning device 4 and the camera 5, and a processing device 7 that is typically constituted by a personal computer, which could internally integrate the storage device 6.

The method used for determining the stress (forces) that should be applied to a tyre during an indoor endurance bench test to simulate with high accuracy a similar outdoor endurance test carried out on roads open to vehicular traffic, will now be described.

The vehicle 1 equipped with the measuring unit 3 is used to carry out the outdoor test that it is wished to simulate indoors and is consequently driven along a sample road route where testing is carried out outdoors on roads open to vehicular traffic.

The mass M of the vehicle 1 is determined beforehand, i.e. before starting the road test; according to one possible embodiment, the mass M of the vehicle 1 can be progressively updated (i.e. reduced) to take into account the reduction due to fuel consumption (which is easy to estimate from information provided by an electronic engine control unit).

While the vehicle 1 is being driven, the satellite positioning device 4 provides, in real time and with a relatively high sampling frequency (typically, at least several Hz), the position P of the vehicle 1 along the sample road route, constituted by the X,Y,Z set of coordinates, and the longitudinal speed V, of forward movement of the vehicle 1; this data is cyclically stored in the storage device 6 with a storage frequency of that is usually equal to the sampling frequency of the satellite positioning device 4 and is synchronized with the sampling frequency of the satellite positioning device 4.

In addition, while the vehicle 1 is being driven, the camera 5 provides images of the road in front of the vehicle 1 in real time; at least a part of these images is cyclically stored in the storage device 6 with a storage frequency that is usually equal to the sampling frequency of the satellite positioning device 4 and is synchronized with the sampling frequency of the satellite positioning device 4 (in this way, each stored image is associated with the corresponding position P of the vehicle 1 at the time when the image was taken).

Once the outdoor test terminates (or rather once the journey along the sample road route is completed), the information stored by the measuring unit 3 whilst travelling along the sample road route is processed to determine the stress (forces) that should be applied to a tyre during an indoor endurance bench test to simulate the outdoor endurance test with high accuracy.

According to a preferred embodiment, moving average filters are applied to the measurements supplied by the satellite positioning device 4 (in particular, to the longitudinal speed $V_x$ of forward movement of the vehicle 1) to eliminate any high frequency noise (very bothersome, especially in a time differentiation).

Using the longitudinal speed $V_x$ data of forward movement of the vehicle 1, the processing device 7 calculates a longitudinal acceleration $A_x$ of the vehicle 1 by determining the rate of change (first time derivative) of the longitudinal speed $V_x$ of forward movement of the vehicle 1.

In addition, using the position P data of the vehicle 1 stored in the storage device 6, the processing device 7 determines a trajectory T of the vehicle 1 in the plane defined by the two coordinates X and Y (corresponding to latitude and longitude); in other words, the trajectory T of the vehicle 1 is given by the evolution of the position P of the vehicle 1 in the plane defined by the X and Y coordinates. Successively, the processing device 7 calculates a radius (R) of curvature of the trajectory T of the vehicle 1 through simple geometrical calculations and then calculates a lateral acceleration $A_y$ of the vehicle 1 based on the longitudinal speed $V_x$ of forward movement (corrected as previously described) and the radius (R) of curvature of the trajectory T through a simple mathematical operation described by the following equation:

$$A_y = V_x^2 / R$$

The processing device 7 calculates a longitudinal inertial force $FI_x$ acting on the vehicle 1 by multiplying the mass M of the vehicle 1 by the longitudinal acceleration $A_x$ of the vehicle 1 and calculates a lateral inertial force $FI_y$ acting on the vehicle 1 by multiplying the mass M of the vehicle 1 by the longitudinal acceleration $A_x$ of the vehicle 1 as described by the following equations:

$$FI_x = M * A_x$$

$$FI_y = M * A_y$$

According to a preferred embodiment, the processing device 7 determines an altitude of the vehicle 1 based on the third coordinate Z, determines the gradient of the road on which the vehicle 1 travels based on the evolution of the altitude of the vehicle 1 through simple geometrical calculations and, lastly, determines a gravitational force FG acting on the vehicle 1 based on the gradient of the road on which the vehicle 1 travels through simple geometrical calculations. In other words, the gravitational force FG acting on the vehicle 1 is calculated by multiplying the overall weight force acting on the vehicle 1 (equal to mass M multiplied by gravitational acceleration G) by the sine of the gradient angle of the road on which the vehicle 1 travels.

According to a preferred embodiment, the processing device 7 also determines an aerodynamic force FA acting on the vehicle 1 as a function of the longitudinal speed $V_x$ of forward movement of the vehicle 1; the aerodynamic force FA can be calculated by using a theoretically-determined equation having experimentally-determined parameters, or can be calculated using an experimentally-determined table (typically using interpolation between the points of the table).

Finally, the processing device 7 determines the overall longitudinal force $F_x$ acting on the vehicle 1 by algebraically adding (i.e. taking positive and negative signs into account) the longitudinal inertial force $FI_x$ (having a positive or negative sign corresponding to a deceleration or an acceleration), the gravitational force FG (having a positive or negative sign corresponding to a descent or a rise) and the aerodynamic force FA (always having a negative sign), as described by the following equation:

$$F_x = FI_x + FG + FA$$

Instead, the overall lateral force. $F_y$ acting on the vehicle 1 is assumed to be equal to the lateral inertial force $FI_y$, i.e. contributions other than the lateral inertial force $FI_y$ are not contemplated.

The overall forces $F_x$ and $F_y$ acting on the vehicle 1 are divided between the tyres 2, i.e. a partial quota of the overall forces $F_x$ and $F_y$ acting on the vehicle 1 is determined for each tyre 2, based on the geometrical characteristics of the vehicle 1 (i.e. the distribution of masses in the vehicle 1) and the types of suspension on the vehicle 1.

At the end of the above-described operations, the time evolution of the longitudinal speed $V_x$, the time evolution of the longitudinal force $F_x$ and the time evolution of the lateral force $F_y$ have been calculated; these time evolutions can be used directly to pilot the actuators of the test bench to simulate the outdoor endurance test with high accuracy.

In accordance with the present invention, the time evolution of the longitudinal speed $V_x$, the time evolution of the longitudinal force $F_x$ and the time evolution of the lateral force $F_y$ are subjected to an optimization process so as to increase the overall efficiency of the indoor bench test, while at the same time maintaining high simulation accuracy with regard to the outdoor endurance test.

The optimization process transforms the longitudinal speed $V_x$ and the forces $F_x$ and $F_y$ from the time domain t (i.e., functions of time t) to the space domain s (i.e., functions of space s), consequently obtaining the longitudinal speed V, and the forces $F_x$ and $F_y$. Since the longitudinal speed $V_x$ is known, this transformation is simple and rapid, as the relation existing between space s and time (i.e., ds=dv·dt) is determined immediately:

$$s(T) = \int_0^T V_x(t) \cdot dt$$

In other words, the longitudinal speed $V_x(s)$ and the forces $F_x(s)$ and $F_y(s)$ are obtained from the longitudinal speed $V_x(t)$ and the forces $F_x(t)$ and $F_y(t)$.

Once the longitudinal speed $V_x$ and the forces $F_x$ and $F_y$ are transformed from the time domain t to the space domain s (i.e. after passing from $V_x(t)$, $F_x(t)$ and $F_y(t)$ to $V_x(s)$, $F_x(s)$ and $F_y(s)$), the longitudinal speed $V_x$ is dilated by applying a multiplication factor k (greater than one) and the space s is dilated by applying a multiplication factor $k^2$ (greater than one) that is obviously greater than multiplication factor k.

In other words, both the longitudinal speed $V_x$ and the space s are dilated (increased) by corresponding multiplication factors k and $k^2$ and space s is dilated more than longitudinal speed $V_x$. In general, the multiplication factor k is between 1.2 and 2.5 and so the multiplication factor $k^2$ is between 1.44 and 6.25 (respectively corresponding to $1.2^2$ and $2.5^2$). The dilated (by multiplication factor k) longitudinal speed $V_x$ and the forces $F_x$ and $F_y$ in the space domain s are resampled with respect to the dilated (by multiplication factor $k^2$) space s.

Once the resampling of the dilated longitudinal speed V, and the forces $F_x$ and $F_y$ with respect to the dilated space s is performed, the resampled longitudinal speed $V_x$ and the resampled forces $F_x$ and $F_y$ are retransformed from the space domain s (i.e., functions of space s) to the time domain t (i.e., functions of time t). This subsequent transformation for returning to the time domain t is necessary because the actuators of the test bench must be piloted according to time t. It is important to note that this further transformation is simple and rapid as the relation between space s and time t is provided directly by the longitudinal speed $V_x$, as previously described.

Summarizing, the following operations are performed:

$V_x(t), F_x(t), F_y(t) => V_x(s), F_x(s), F_y(s)$   1.

$V_x(s), F_x(s), F_y(s) => V_x(s \cdot k^2) \cdot k, F_x(s \cdot k^2), F_y(s \cdot k^2)$   2.

$V_x(s \cdot k^2) \cdot k, F_x(s \cdot k^2), F_y(s \cdot k^2) => V_x(t), F_x(t), F_y(t)$   3.

According to a more general embodiment, once the longitudinal speed $V_x$ and the forces $F_x$ and $F_y$ are transformed from the time domain t to the space domain s, the longitudinal speed $V_x$ is dilated by applying a multiplication factor $k_v$ (greater than one) and the space s is dilated by applying a multiplication factor $k_s$ (greater than one) that is larger than multiplication factor $k_v$, but is not necessarily the square of multiplication factor $k_s$. In other words, both the longitudinal speed $V_x$ and the space s are dilated (increased) by corresponding multiplication factors $k_v$ and $k_s$ and the space s is dilated more than the longitudinal speed $V_x$ (in any case, multiplication factor $k_s$ is equal to or greater than the square of multiplication factor $k_v$). According to a possible embodiment, multiplication factor $k_s$ is dependent on multiplication factor $k_v$ and, in particular, multiplication factor $k_s$ is a power n (with n greater or equal to 2) of multiplication factor $k_v$ (i.e., $k_s = k_v^n$); according to other embodiments, a different mathematical association could exist between the two multiplication factors $k_v$ and $k_s$, or there might not be any mathematical association between the two multiplication factors $k_v$ and $k_s$, as long as the condition $k_s > k_v^2$ is respected.

Figure 4:
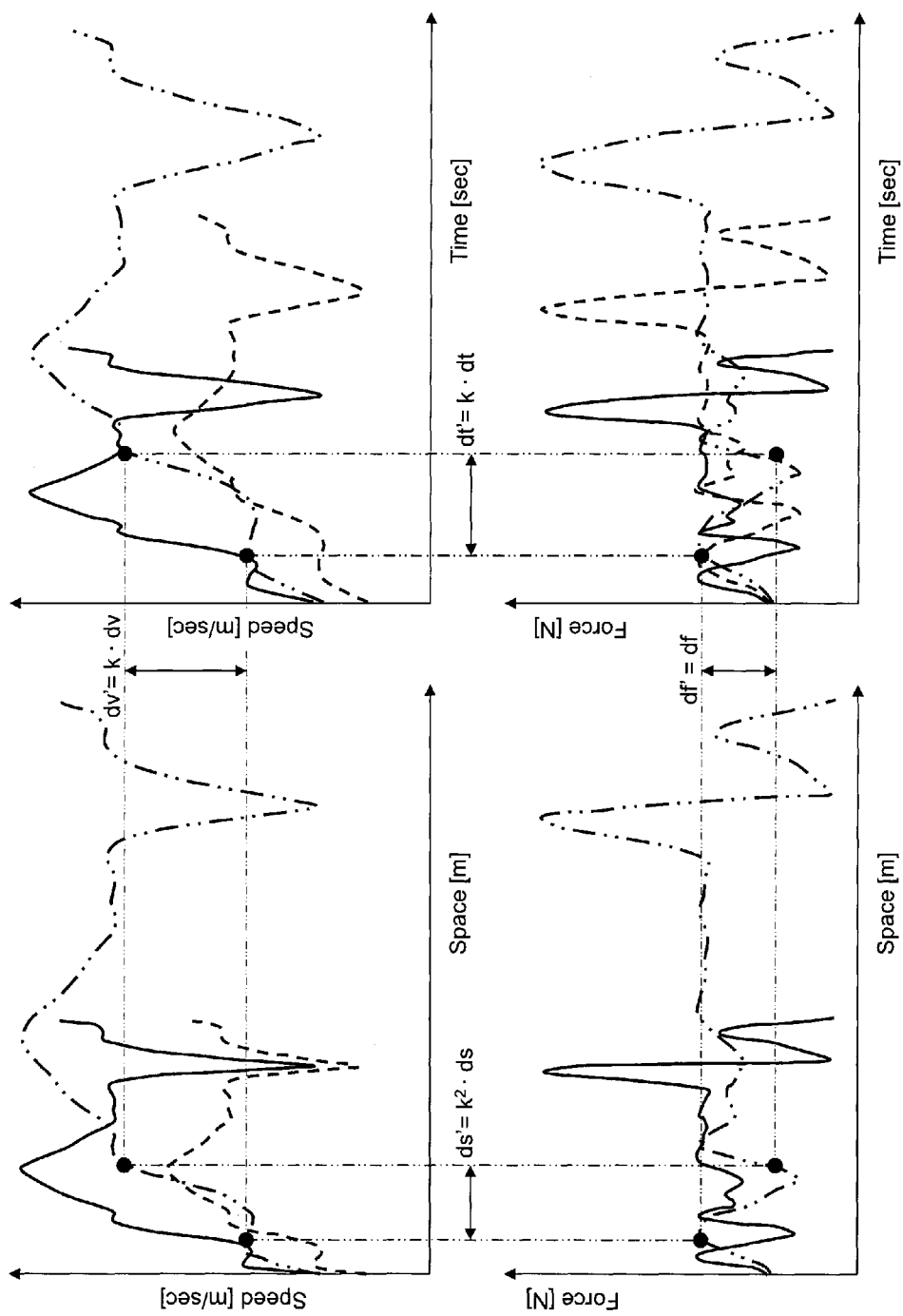
FIG. 4 is a diagram that schematically shows some of the mathematical transformations that are performed during an optimization process that increases the overall efficiency of the indoor bench test.

FIG. 4 schematically shows some of the mathematical transformations that are performed during the optimization process: the two graphs on the left show the evolution of the longitudinal speed $V_x$ and the longitudinal force $F_x$ as functions of space s (i.e., in the space domain) while the two graphs on the right show the evolution of the longitudinal speed $V_x$ and the longitudinal force $F_x$ as functions of time t (i.e., in the time domain).

For a better understanding of the optimization process, a simple numerical example is given below. It is assumed that the vehicle is driven at 40 km/h along a straight route 10 km long and that the driver alternately steers to the right and the left (in substance, a slalom or zigzag around the rectilinear trajectory) a 100 times (therefore every 100 meters, or every 9 seconds) imposing wear energy on each tyre 2 equal to 10,000 Nkm and an wear energy density of 1,000 N (10,000 Nkm/10 Km); in these conditions:

duration of the test is 15 minutes (10 km/40 km/h);
efficiency is 0.66 km/min (10 km/15 min);
overall wear energy received by each tyre 2 is 10,000 NKm;
wear energy density is 1,000 N.

If the speed is extended by multiplication factor $k_v$ equal to 1.5 and the space is extended by multiplication factor $k_s$ equal to 2.25 (i.e., $1.5^2$), then:

the driver must alternately steer to the right and the left every 225 meters (100·2.25) or every 13.5 seconds;
overall length becomes 22.5 Km;
duration of the test becomes 22.5 minutes (22.5 km/60 km/h);
efficiency becomes 1 km/min (22.5 km/22.5 min);
overall wear energy received by each tyre 2 becomes 22,500 NKm (1000N·22.5 Km);
wear energy density remains unchanged at 1,000 N.

On comparing the two situations, it appears evident that the second situation is more efficient (1 km/min against 0.66 km/min) even though it has a lower stress level imparted by the driver (or rather, by the actuators of the test bench), as instead of swerving every 9 seconds, swerving must be every 13.5 seconds.

The above-described optimization process enables test efficiency to be significantly increased; in particular, the main quantity used for evaluating test efficiency is the average speed (i.e., the mean ratio between space and time), which is increased by an amount equal to multiplication factor $k_v$.

In addition, the above-described optimization process has a positive effect on the rapidity with which the stresses applied to the tyre under test are varied (to avoid exceeding the test bench's limits and thus render the test unworkable, it is important that the rapidity with which the stresses applied to the tyre under test are varied is not too high).

One quantity used for assessing the rapidity with which the stresses applied to the tyre under test are varied is the "speed rate", which is equal to the longitudinal acceleration (i.e., the first time derivative of the longitudinal speed $V_x$); this rate varies by an amount equal to the ratio between the square of multiplication factor $k_v$ ($k_v^2$) and multiplication factor $k_s$ (i.e., by an amount equal to $k_v^{2-n}$ when $k_s = k_v^n$ and therefore by an amount equal to 1 when $k_s = k_v^2$). A further quantity used to assess the speed of the stresses applied to the tyre under test is the "input rate", which is equal to the first time derivative of the forces $F_x$ and $F_y$; this rate varies by an amount equal to the ratio between multiplication factor $k_v$ and multiplication factor $k_s$ (i.e., by an amount equal to $k_v^{1-n}$ when $k_s = k_v^n$ and therefore by an amount equal to $k_v^{-1}$ when $k_s = k_v^2$)

The above-described optimization process is based on the assumption (amply verified, as long as the longitudinal speed $V_x$ does not become too high) that tyre wear depends on the number of revolutions performed by the tyre independently (or rather, almost independently) of the speed with which the tyre turns. In reality, speed has a minimum impact on wear, but is has been observed that in a first approximation, the wear effect due to changes in speed can be ignored (at least as long as the longitudinal speed $V_x$ does not become too high).

The above-described method for determining the stress that should be applied to a tyre during an indoor endurance bench test has numerous advantages.

First of all, the above-described method is of simple and inexpensive implementation, as the use of a single measuring instrument (the satellite positioning device 4) that is relatively inexpensive, easy to install and does not require any presetting, is contemplated.

The above-described method is extremely precise and, above all, is in no way affected by time drifts, as the satellite positioning device 4 has low noise levels, provides high precision and is not affected by time drifts (either due to component aging or thermal effects) as, unlike an accelerometer, it has no sensitive elements physically involved in taking measurements.

The satellite positioning device 4 is in no way affected by movements of the body of the vehicle 1 and therefore the measurements provided by the satellite positioning device 4 are not influenced by movements of the body of the vehicle 1 on the suspension.

Thanks to the information provided by the satellite positioning device 4 on the altitude of the vehicle 1, it is also possible to determine the gravitational force FG acting on the vehicle 1 with precision, based on the gradient of the road on which the vehicle 1 is travelling.

Finally, thanks to the above-described optimization process, it is possible to significantly increase the efficiency of indoor bench testing without having a negative effect on the rapidity with which stress is applied to the tyre under test.

The invention claimed is:

1. A method of determining the stress that should be applied to a tire during an indoor endurance bench test, the method comprising the steps of:
   driving a vehicle along a sample road route;
   measuring variations in the longitudinal speed and position of the vehicle as it the vehicle travels along the sample road route; and
   calculating using a processor the inertial forces acting on at least one tire of the vehicle as the said tire travels along the sample road route, on the basis of variations in the longitudinal speed and position of the vehicle;
   the method comprising the further steps of:
   transforming the inertial forces and the longitudinal speed from the time domain to the space domain;
   expanding the longitudinal speed in the space domain by applying a first multiplication factor greater than one;
   expanding the space by applying a second multiplication factor greater than one and equal or greater than the first multiplication factor, and resampling the expanded longitudinal speed and the inertial forces with respect to the expanded space; and
   retransforming the resampled longitudinal speed and the resampled inertial forces from the space domain to the time domain.

2. A method according to claim 1, wherein the second multiplication factor is dependent on the first multiplication factor.

3. A method according to claim 1, wherein the second multiplication factor is a power n of the first multiplication factor and the exponent n is equal or greater than 2.

4. A method according to claim 1 wherein the second multiplication factor is the square of the first multiplication factor.

5. A method according to claim 1, wherein the first multiplication factor ranges between 1.2 and 2.5.

6. A method according to claim 1, and comprising the further steps of:
   determining the longitudinal acceleration of the vehicle by calculating the rate of change in the longitudinal speed of forward movement of the vehicle;
   determining a trajectory of the vehicle on the basis of variations in the position of the vehicle;
   determining a radius of curvature of the trajectory of the vehicle;
   calculating the lateral acceleration of the vehicle on the basis of longitudinal speed of forward movement and the radius of curvature of the trajectory;
   calculating a longitudinal inertial force acting on the vehicle by multiplying the mass of the vehicle by the longitudinal acceleration of the vehicle; and
   calculating a lateral inertial force acting on the vehicle by multiplying the mass of the vehicle by the longitudinal acceleration of the vehicle.

7. A method according to claim 6, wherein the position of the vehicle is defined by three coordinates, and the trajectory of the vehicle is determined in the plane defined by two coordinates corresponding to latitude and longitude.

8. A method according to claim 7, and comprising the further steps of:
   determining the altitude of the vehicle on the basis of a third coordinate;
   determining the gradient of the road on which the vehicle is travelling, on the basis of variations in the altitude of the vehicle;
   determining a gravitational force acting on the vehicle on the basis of the gradient of the road on which the vehicle is travelling; and
   algebraically adding the gravitational force and the longitudinal inertial force.

9. A method according to claim 6 and comprising the further steps of:
   determining an aerodynamic force acting on the vehicle on the basis of the longitudinal speed of forward movement of the vehicle; and
   algebraically adding the aerodynamic force and the longitudinal inertial force.

10. A method according to claim 6, wherein the longitudinal speed of forward movement and position of the vehicle are measured by a satellite positioning device.

11. The method according to claim 1, wherein the measured variations in the longitudinal speed and position of the vehicle are stored in electronic memory.

12. The method according to claim 1, wherein the step of measuring is carried out using a measuring unit attached to the vehicle, the measuring unit comprising a satellite positioning device to measure the position and movement of the vehicle.

13. The method according to claim 12, wherein the measuring unit comprises a camera that captures the road in front of the vehicle.

* * * * *